United States Patent [19]

Chen

[11] 4,255,404

[45] Mar. 10, 1981

[54] ISOTOPIC SEPARATION

[75] Inventor: Cheng-lin Chen, Penn Hills, Pa.

[73] Assignee: Westinghouse Electric Corp., Pittsburgh, Pa.

[21] Appl. No.: 863,202

[22] Filed: Dec. 22, 1977

[51] Int. Cl.² ............... C01G 43/06; B01D 53/24; B01D 53/00; B01D 59/00; B01J 1/10
[52] U.S. Cl. ............................... 423/258; 55/17; 204/157.1 R; 250/423 P; 423/1; 423/3; 423/19; 423/210; 423/259
[58] Field of Search ............... 423/3, 258, 210, 19, 423/1, 259; 250/423 P; 204/157.1 R; 55/17

[56] References Cited

U.S. PATENT DOCUMENTS

| | | | |
|---|---|---|---|
| 3,740,552 | 6/1973 | Pressman | 250/41.9 SE |
| 3,772,519 | 11/1973 | Levy et al. | 250/41.9 SE |
| 3,853,528 | 12/1974 | Wodrich et al. | 55/17 X |
| 3,877,892 | 4/1975 | Bley et al. | 55/17 |
| 3,937,956 | 2/1976 | Lyon | 204/157.1 R X |
| 3,989,483 | 11/1976 | Becker et al. | 55/17 |
| 4,000,051 | 12/1976 | Kaldor | 204/157.1 R |
| 4,000,420 | 12/1976 | Harris | 250/423 P X |
| 4,031,389 | 6/1977 | Russell | 250/423 P X |
| 4,031,397 | 6/1977 | Cardillo | 250/423 P |
| 4,082,633 | 4/1978 | Eerkens | 204/157.1 R X |

FOREIGN PATENT DOCUMENTS 690681 7/1964 Canada .

OTHER PUBLICATIONS

Laser Program Annual Report-1974, VCRL-50021-74, Lawrence Livermore Lab., Mar. 1975, pp. 495-497.
Robinson, C. P. et al., Some Developments in Laser Isotope Seperation Research at Los Alamos, La-UR-7-6-171, 2/76.
Wang, C. "Garden Hose Separation of Gaseous Isotopes," *Nature*, 253:260-262, 1975.

*Primary Examiner*—Richard E. Schafer
*Attorney, Agent, or Firm*—Edward L. Levine

[57] ABSTRACT

Method and apparatus for separating isotopes in an isotopic mixture of atoms or molecules by increasing the mass differential among isotopic species. The mixture containing a particular isotope is selectively irradiated so as to selectively excite the isotope. This preferentially excited species is then reacted rapidly with an additional preselected radiation, an electron or another chemical species so as to form a product containing the specific isotope, but having a mass different than the original species initially containing the particular isotope. The product and the remaining balance of the mixture is then caused to flow through a device which separates the product from the mixture based upon the increased mass differential.

2 Claims, 4 Drawing Figures

ISOTOPIC SEPARATION

BACKGROUND OF THE INVENTION

1. Field of the Invention

This invention relates to mass isotopic separation and more particularly provides separation method and apparatus based upon mass differences enhanced by photo-irradiation.

2. Description of the Prior Art

Selected isotopic species are useful for many purposes including medical apparatus and treatment, tracer studies of chemical and biological processes, and as target materials and fuels for nuclear reactor application. Perhaps the largest present utilization is for nuclear reactors, which typically require, for example, fuel enriched in Uranium-235.

The system most widely used today for isotopic separation is gaseous diffusion, which requires a large, complex, and costly cascading network. More recently systems are being considered based upon technologies such as distillation and photo-ionization in the presence of magnetic and electric fields. Exemplary of the latter are U.S. Pat. No. 3,772,519 in the name of R. H. Levy et al and U.S. Pat. No. 3,443,087 in the name of J. Robieux et al.

While such systems offer much promise for increasing the efficiency of isotopic separation processes, it is desirable to provide further alternatives.

SUMMARY OF THE INVENTION

This invention provides additional alternatives to existing and proposed isotope separation techniques. It is based upon the principle that the isotope separation factor of a mass separation device, such as a gas centrifuge or an aerodynamic nozzle, is enhanced when the mass difference among isotopic species is made larger within the nozzle or rotor region.

In accordance with the invention the mass difference is increased by one or more of several processes, each of which includes selective excitation of a mixture including an isotopic species containing a particular isotope. The species is excited and, in the excited state, can preferentially be made to undergo a selective reaction which results in a product containing the particular isotope, the product further having a mass which is much different than that of the original isotopic species. The mass differential among the isotopic species of the mixture is therefore enhanced. Isotope separation based upon the enhanced mass difference then is utilized to separate the desired product from the mixture.

In one embodiment the mass differential is increased through a photo-selective dissociative electron attachment reaction. The mixture, including the selectively excited species, is exposed to free electrons with proper energies such that the selectively excited molecular species undergo dissociation after electron attachment. The product negative ion is of smaller mass than the original isotopic species, and hence is more easily separated from the mixture by methods dependent upon the mass of the species.

In another embodiment the mass difference is increased through multi-step selective dissociative ionization. Subsequent to placing the desired isotopic species in an excited state, it is further selectively irradiated, such as in a selected field, beyond the ionization and dissociation limit, so that a free electron and a neutral fragment are released from the molecule. The remaining product is a positive ion of different mass than the original species, and either the neutral fragment or the ion contains the particular desired isotope.

Another embodiment is the combination of the two processes thus described. A selected compound in a mixture under selective irradiation has constituents which can undergo either of the above processes. Here, the photo-electrons released from the multi-step selective dissociative ionization reaction are in the proper energy range such that photo-selective dissociative electron attachment can be brought about with the selectively excited isotopic species. Therefore, the product ions include positive and negative ions of the same isotopic species. These ions may then react together forming neutral molecules as the final product. These product molecules, having smaller than original mass, represent an increase in the original isotopic mass difference, and are accordingly more easily separated from the balance of the mixture.

In yet another embodiment the selectively excited species is made to undergo a preferential chemical reaction with a reactant to form a chemical compound containing the selected isotopic species. The product has a different mass than the original isotopic species, and is accordingly easily separated based upon the increased mass differential.

It will be apparent to those skilled in the art that the various steps of the inventive method are not completely efficient. Accordingly, it is to be understood that reference to the term "separation" and the like refer to increasing the concentration of the selected isotope as compared to the feed concentration.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Atomic and molecular species of differing mass can be separated by centrifugal force so that the heavier species traverse one preferred flow path, while the lighter species traverse another. Once different preferred flow paths or locations are established for different species, separate collection is relatively simple.

Figure 1:
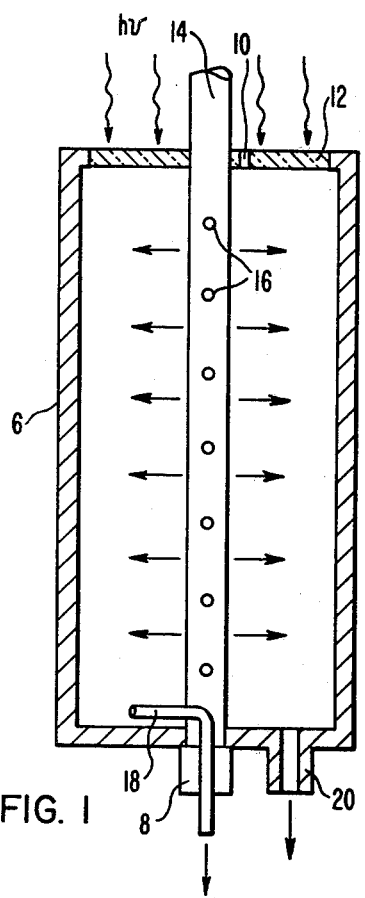
FIG. 1 is a schematic of a rotor application in accordance with this invention.
Figure 2:
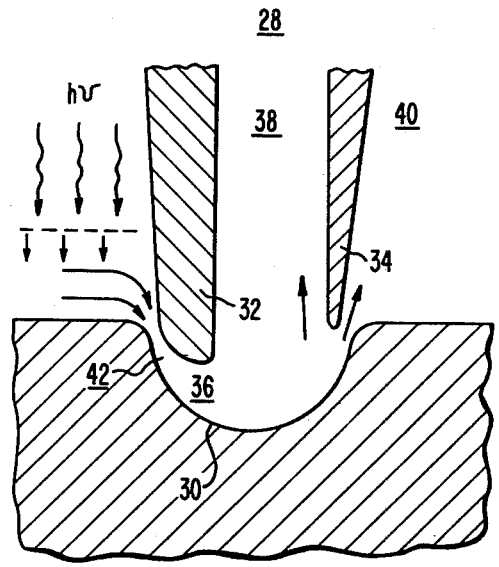
FIG. 2 is a schematic of a high velocity nozzle application of this invention.

Two of many types of mass separation devices are simply illustrated in FIGS. 1 and 2. It is to be understood that the invention is not limited to the two devices exemplified. FIG. 1 shows a rotor 6 which is driven by means such as a motor 8 at a high rotational velocity. The rotor 6 includes an inlet 14 through which a mixture to be separated, preferably gaseous, enters the rotor 6. Electrons, in accordance with some embodiments of this invention, can also be injected through the inlet 14 or through other inlet means 10. The inlet 14 also includes means for discharging the mixture or other particles or species within the rotor, such as perforations 16.

The rotor in accordance with this invention can also include a transparent surface, such as the window 12 for injection of photon irradiation discussed hereafter. By virtue of the high angular velocity of the rotor 6, the mixture experiences a centrifugal force such that the heavier species tend to aggregate and have a higher concentration near the outer periphery of the rotor, while lighter species tend to congregate near the center of the rotor. Accordingly, the heavy species can be discharged through an outlet 18 near the periphery of the rotor, and the lighter species through outlet 20 closer to the center of the rotor. FIG. 2 illustrates the nozzle region 28 of a centrifuge. By virtue of the curved surface of a deflector 30 and the relative positioning of prongs 32, 34, species entering a deflection region 36 are discharged through outlet 38 or outlet 40. The species experience a large centrifugal force as a jet stream passing through a neck area 42, with the heavier species traversing a path in preference to outlet 40 and the lighter particles traversing a preferential path to outlet 38.

An isotope separation factor (S) for such systems can be shown to be $$S = \left[ \exp\frac{\Delta M v^2}{2RT} - 1 \right] \tag{1}$$

where $\Delta M$ is the difference in molecular weight of two isotopic species, v is the peripheral velocity of the rotor or the expanding jet velocity, R is the universal gas constant, and T is the absolute temperature of the gaseous mixture. For an exemplary separation of Uranium-235 from Uranium-238 where $v = 2.0 \times 10^4$ cm/sec, $T = 333°$ K., and $\Delta M = 3$, the separation factor $S = 2.24 \times 10^{-2}$.

From Equation (1) it can be seen that the separation factor can be increased if the mass difference, $\Delta M$, is increased.

Figure 3:
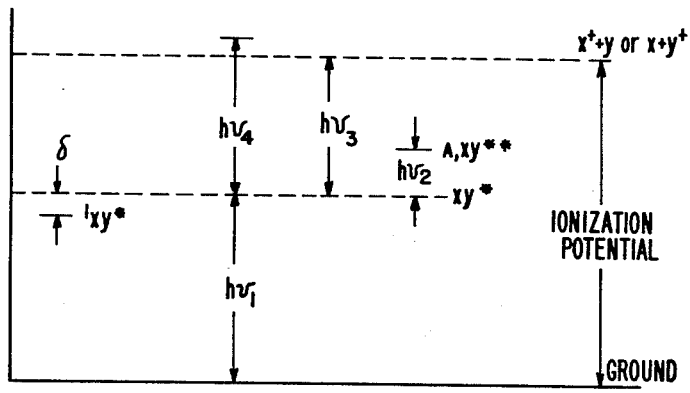
FIG. 3 is a schematic representation of photo-excitation processes.

An increase in the mass difference can be effected in several manners based upon selective photo-excitation. FIG. 3 illustrates, in simplified fashion, selective photo-excitation processes. Additional detail of such processes is provided in the above-mentioned Levy et al patent, and will only be briefly summarized herein. FIG. 3 illustrates that molecular or atomic species can exist in different energy states, including the ground state and the excited states including rotational, vibrational and-/or electronic excitation. In the Figure, an isotopic shift of $\delta$ is shown for the absorption spectra between compound XY and $^1$XY wherein X and $^1$X represent different isotopes of a given element, and Y represents a different element or compound in the molecule XY. FIG. 3 also shows that XY can be selectively excited in preference to $^1$XY, from the ground state to a preselected excited state, represented as XY*, by addition of energy via absorption of radiation $h\nu_1$, where $\nu_1$ is the preselected radiation frequency and h is the Planck constant. While multiple excited states exist, such as state "A" in FIG. 3 which can be achieved through further selected irradiation of XY* with $h\nu_2$ (to a state represented as XY**), the Figure also shows that XY* can also be selectively raised to its dissociative ionization threshold by selective addition of $h\nu_3$, or above the threshold by $h\nu_4$. Upon reaching the dissociative ionization state, an electron is ejected, and positive ion X$^+$ (or Y$^+$) and neutral fragment Y (or X) are formed.

In all of the embodiments disclosed herein, a selected isotopic specie is initially preferentially excited by narrow band radiation at a predetermined wavelength.

In one embodiment, the selectively excited XY* is exposed to and hence reacted with free electrons (e$^-$), such that a negative ion containing the particular isotope X is formed. This dissociative electron attachment reaction can be represented as:

$$XY^* + e^- \rightarrow X^- + Y \tag{2}$$

or

$$XY_n^* + e^- \rightarrow XY^-_{n-1} + Y \tag{3}$$

It is known that the reactions (2) and (3) have a cross-section which increases strongly with the degree of internal excitation of XY. Hence, selective photo-excitation of gaseous molecules in conjunction with reactions with electrons having appropriate energy will produce $X^- + Y$ in preference to $^1X^- + Y$, or $XY^-_{n-1} + Y$ in preference to $^1XY_{n-1} + Y$.

An exemplary process based upon a mixture containing $U^{235}F_6$ and $U^{238}F_6$ (uranium hexafluoride) can be described as:

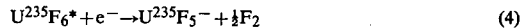
$$U^{235}F_6^* + e^- \rightarrow U^{235}F_5^- + \tfrac{1}{2}F_2 \tag{4}$$

The mixture, subsequent to reaction (4), includes $U^{238}F_6$, some unreacted $U^{235}F_6$, free fluorine and electrons, and the newly formed $U^{235}F_5^-$. It is evident that the mass of the $U^{235}F_5^-$ is different than the balance of constituents of the mixture, and, in accordance with the invention, can be separated accordingly. It will also be noted that through charge exchange reactions, for example, $UF_5^- + UF_6 \rightarrow UF_5 + UF_6^-$, the $UF_5^-$ may convert to the neutral species $UF_5$. This charge exchange does not, however, substantially affect the increased mass differential which is the key factor for improved isotope separation.

The exemplary reaction (4) has a threshold of about 1 eV at room temperature, and rises to a peak at about 2 eV. Accordingly, the electrons should have an energy less than 1 eV to avoid reaction with ground state $U^{238}F_6$ molecules. The separation factor S for the exemplary reaction, where $\Delta M = 22$ (between $U^{238}F_6$ and $U^{235}F_5$), $v = 2.0 \times 10^4$ cm/sec, and $T = 333°$ K., is:

$$I = \exp\left[\frac{(22)(2.0 \times 10^4)^2}{2(8.32 \times 10^7) 333}\right] - 1 = 0.172$$

which represents a gain of a factor of 8 over the prior art type system exemplified above.

In another embodiment selective, step-wise absorption is utilized to form a positive ion. The above-mentioned Robieux et al patent teaches irradiating an isotopic mixture with two light beams, one of which is ultraviolet. The first beam, $h\nu_1$, is preferably highly monochromatic for selective excitation:

$$h\nu_1 + XY \rightarrow (XY)^* \tag{5}$$

and the second beam provides energy to dissociatively ionize the (XY)*, i.e.,

$$h\nu_2 + (XY)^* \rightarrow X^+ + Y + e^- \tag{6}$$

Figure 4:
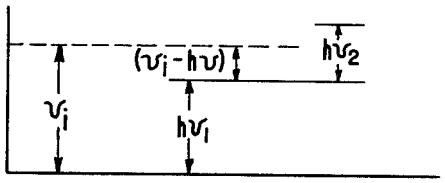
FIG. 4 is another schematic representation of photo-excitation processes.

With reference to FIG. 4, it has been found highly desirable to add the additional constraint to the Robieux et al teaching that $(V_i - h\nu_1) < h\nu_2 < V_i$, where $V_i$ is the ionization potential of the reaction $XY \rightarrow X^+ + Y + e^-$. This constraint permits step-wise ionization of desired isotopic species while precluding direct ionization of the undesired isotopic species by $h\nu_2$. It does not, however, preclude step-wise ionization of an undesired species according to:

$$h\nu_2 + {}^1XY \rightarrow ({}^1XY)^* \quad (7)$$

and $$h\nu_1 + ({}^1XY)^* \rightarrow {}^1X^+ + Y + e^- \quad (8)$$

where ${}^1X$ in reactions (7) and (8) is another isotope of X in reactions (5) and (6). This non-selective parallel occurring ionization mechanism is likely to defeat the intent of the selective ionization unless $h\nu_2$ is further constrained to be a wavelength to which ${}^1XY$ is transparent. Alternatively, both $h\nu_1$ and $h\nu_2$ can be highly monochromatic so as to be selectively absorbed by XY only.

A further improvement can be achieved by selecting $h\nu_1$ and $h\nu_2$ such that, in addition to the constraints set forth above, the electron production in reaction (6) can be made to have suitable energy to be selectively and dissociatively attached to XY*. A dissociative electron attachment process has a lower threshold and a larger cross-section for an internally excited species than for a normal species. Therefore, for an electronegative gas such as, for example, UF$_6$, the following selective processes are highly possible:

$$XY^* + e^- \rightarrow X^- + Y \quad (9)$$

and $$X^- + X^+ \rightarrow 2X \quad (10)$$

Accordingly, with respect to an exemplary mixture of $U^{238}F_6$ and $U^{235}F_6$, from reactions (5) and (6) in accordance with the discussed constraints:

$$h\nu_1 + U^{235}F_6 \rightarrow U^{235}F_6^* \quad (11)$$

and $$U^{235}F_6^* + h\nu_2 \rightarrow U^{235}F_5^+ + F + e^- \quad (12)$$

The positive $U^{235}F_5^+$ ion formed can accordingly be easily separated from the balance of the mixture, including $U^{238}F_6$, unreacted $U^{235}F_6$, and free fluorine and electrons, based upon increased mass difference principles. The separation factor S for this process is the same as that for production of the negative ion $U^{235}F_5^-$, 0.172.

Furthermore, the electrons produced in reaction (12) can, if produced at suitable energies, react with $U^{235}F_6$ as from reaction (4)

$$U^{235}F_6^- + F \quad (4)$$

$$U^{235}F_6^* + e^- \rightarrow U^{235}F_5^- + F \quad (4)$$

Therefore, the benefits of both selective dissociative ionization and selective dissociative electron attachment can both be achieved. The $U^{235}F_5^+$ and $U^{235}F_5^-$ can react under the influence of space charge in accordance with reaction (10) as:

$$U^{235}F_5^+ + U^{235}F_5^- \rightarrow 2U^{235}F_5 \quad (13)$$

The product $U^{235}F_5$ can be separated based upon the increased mass differential principle. The cross-section for the process of reaction (4) can be enhanced by varying the photon energy $h\nu_2$ such that the electrons ejected in reaction (12) are at suitable energies. The separation factor of the overall process of reaction (13) is also S=0.172.

In yet another embodiment, referred to as photochemical enhancement of mass differential, a selective chemical reaction is utilized in conjunction with selective excitation. An endothermic chemical process can be generally described as:

$$X + YZ + ENERGY \rightarrow XZ + Y \quad (14)$$

In reaction (14), the energy required can be identified as that of the excitation of X to a particular state or states. Further, this state is optically related to the ground state. Therefore, in accordance with the isotopic shift, XZ can be created in preference to ${}^1XZ$. For example, it has been shown by Pertel and Gunning (Can. J. Chem., Vol. 37, p. 35, 1959) that photo-excited isotopes of mercury can be preferentially reacted with water vapor as follows:

$${}^iHg^* + HOH \rightarrow {}^iHg\ OH + H \quad (15)$$

and $${}^iHg^* + HOH \rightarrow H + OH + {}^iHg \quad (16)$$

where i denotes a selected isotope. By analogy, it is expected that UF$_6$ can also be made to preferentially undergo the reaction:

$$U^{235}F_6^* + nH_2 \rightarrow U^{235}F_4 + 2HF + (N-1)H_2 \quad (17)$$

Accordingly, the $U^{235}F_4$ can be separated from the mixture based upon the increased mass differential.

It will be recognized that in all of the disclosed mass enhancement separation processes there is a finite probability that some of the selectively reacted isotopes may suffer an isotopic exchange with another isotope:

$$XZ + {}^1X \rightarrow {}^1XZ + X \quad (18)$$

or for example, $$U^{235}F_5 + U^{238} \rightarrow U^{238}F_5 + U^{235} \quad (19)$$

Since the mass separation system utilized will be based upon separation and recovery of the desired isotopic species prior to isotopic exchange of the type illustrated in reaction (18), such exchange is detrimental to the overall separation efficiency. Accordingly, the time between creating the desired species and its passage through the separating device is preferably minimized.

For example, the formation time $t_f$ of the negative ion $X^-$ in reaction (2) can be estimated to be $$t_f = 1/k_a n_e \text{ sec},$$

where $k_a$ is the dissociative electron attachment coefficient in cm$^3$/sec and $n_e$ is the electron density in the reaction zone per cm$^3$. The isotopic exchange time $t_{ex}$ for reaction (18) is $$t_{ex} = 1/k_{ex}[^1XZ] \text{ sec,}$$

where $k_{ex}$ is the exchange rate coefficient in cm$^3$/sec and $[^1XZ]$ is the density of the undesired isotopic species. The transit time $t_t$ of the mixture passing through the exemplary devices is $$t_t \approx 1/v$$

where l is the length of the rotor or of the nozzle deflector and v is the velocity of the mixture passing into the nozzle. It is therefore desirable to maintain the relationship $t_f < t_t < t_{ex}$ in order to minimize isotopic exchanges.

I have therefore disclosed mass separation processes including methods for increasing the mass differential among isotopic species in a mixture. Many modifications and additions are possible in view of the above teachings. It therefore is to be understood that within the scope of the appended claims the invention can be practiced other than as specifically described.

I claim:

1. A method for separating isotopic species in an isotopic mixture including a first species having a first isotope and a second species having a second isotope, said method comprising:
   (a) a selectively exciting said first species in preference to said second species:
   (b) reacting some of said selectively excited first species with a predetermined radiation so as to promote selective dissociative ionization of said first species resulting in a product some of said product being a positive ion, said product also including a neutral fragment and an electron;
   (c) reacting some of said selectively excited first species with said product electron so as to promote dissociative electron attachment of some other of said first species resulting in some of said product being a negative ion;
   (d) reacting said product negative ion with said product positive ion so as to form a product neutral species of differing mass than said first or second species; and
   (e) flowing said mixture through a device shaped and operable to impart an angular velocity to the constituents of said flowing mixture such that, as a result of said difference in mass, said product neutral species traverses a preferential flow path different than the flow path of the balance of said mixture.

2. A method for separating isotopic species in an isotopic mixture including a first species having a first isotope and a second species having a second isotope, said method comprising:
   (a) selectively exciting said first species in preference to said second species;
   (b) reacting some of said selectively excited first species with a predetermined radiation so as to promote selective dissociative ionization of said first species resulting in a product, some of said product being a positive ion, said product also including a neutral fragment and an electron;
   (c) reacting some other of said selectively excited first species with said product electron so as to promote dissociative electron attachment of said other first species resulting in another product including a negative ion;
   (d) reacting said product negative ion with said product positive ion so as to form a product neutral species of differing mass than said first or second species; and
   (e) separating said product neutral species from the balance of said mixture.

* * * * *